Oct. 5, 1948.                F. L. HAUSHALTER                2,450,727
                      METHOD OF RESILIENTLY MOUNTING
                             A ROLL ON A SHAFT
                            Filed Jan. 22, 1946
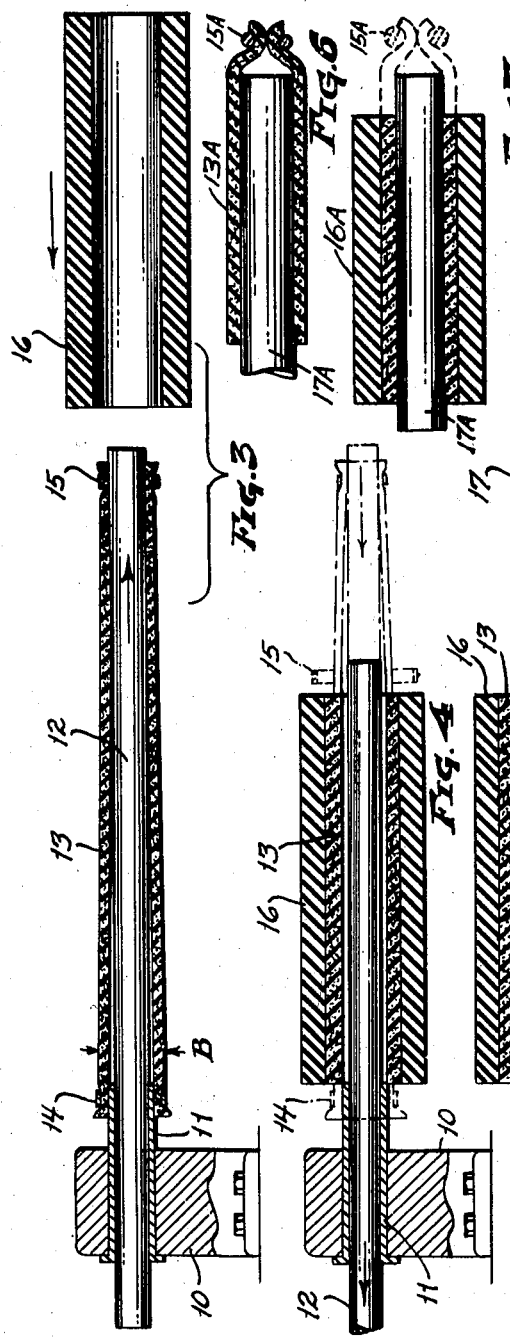
INVENTOR.
FRED L. HAUSHALTER
BY
Bates, Teare, & McBean
ATTORNEYS Patented Oct. 5, 1948

2,450,727

UNITED STATES PATENT OFFICE 2,450,727

METHOD OF RESILIENTLY MOUNTING A ROLL ON A SHAFT

Fred L. Haushalter, Pontiac, Mich.

Application January 22, 1946, Serial No. 642,684

4 Claims. (Cl. 29—148.4)

This invention relates to a method of resiliently mounting a roll on a shaft, the roll having an outer covering of relatively hard material and a cushioning core of softer material mounted on a projecting shaft and thus suitable for use, for example, as a typewriter platen, a printing roll, a paper making machinery roll and the like.

Rubber covered cushion rolls are usually fastened to a shaft, but in manufacturing the rolls one of the difficulties has been to hold the shaft rigidly in place and against the soft rubber core, either by curing the rubber with the shaft in place, or by cementing the shaft to the core.

An object of the present invention is to provide a method for making a rubber covered cushion roll in which the inner core will be held firmly in place within the outer tube and in which the shaft will be held firmly in place within the inner core without the need for curing the material or cementing the shaft to the material.

In the drawings, Fig. 1 is a longitudinal cross-sectional view illustrating an inner sleeve mounted upon a stretching apparatus and before the stretching operation; Fig. 2 is a longitudinal section through the outer cylinder; Fig. 3 is a view similar to Figs. 1 and 2, but illustrating a further step in which the inner sleeve have been stretched and the outer cylinder is about to be placed thereover; Fig. 4 illustrates the parts after the inner sleeve has been allowed to contract; Fig. 5 illustrates the shaft being pressed through the assembled inner and outer sleeves, the broken lines representing the finished article; Fig. 6 is a sectional view similar to Fig. 1, but showing the shaft of the final assembly being used for stretching the sleeve, and Fig. 7 shows the shaft and sleeve of Fig. 6 forced into the outer sleeve.

In Figs. 1 to 5, I have shown one method of performing the invention and also the finished article resulting therefrom. Thus, in Fig. 1 a support 10 carries a fixed sleeve 11 which in turn slidably carries a rod 12. One end of an inner tube or sleeve 13 of an appropriate soft and resilient material is bound to the sleeve 11 as by a band 14. The other end of the tube is bound to the rod as by a band 15.

Referring to Fig. 3, it will be seen that as the rod 12 is driven to the right by a power means (not shown) the tube is stretched and elongated. The elongation is accompanied by a reduction in wall thickness and in the outer diameter of the tube, and the elongation is continued until the diameter A of the unstretched tube in Fig. 1 is reduced to the diameter B (Fig. 3), which is smaller than the diameter C of the tube 16.

The outer cylinder, shown in Fig. 2 has substantially the length, outer diameter, hardness and resiliency desired for the finished platen or roll. The inner diameter A is normally smaller than the original diameter A of the tube 13, but as aforesaid is larger than the diameter B. Thus the outer cylinder may be slipped axially over the stretched inner cylinder to a position near the support, as is shown in Fig. 4. The rod 12 may then be withdrawn and the inner cylinder is thereby contracted in length, and in doing so is expanded in diameter and is forced into gripping engagement with the end surface of the inner cylinder. In this manner the stress is uniformly distributed through the tube. The fastenings 14 and 15 are then released and removed, the composite tubing is removed from the rod, and a trimming operation is performed to make the ends of the two cylinders flush and to the desired length.

In the method of Figs. 1 to 5 a finished platen shaft 17 is then forced axially through the composite tube to the final position illustrated in broken lines at 18. The various diameters of the tubes are so designed that the resulting inner diameter of the confined inner tube is smaller than that of the shaft, whereby the inner cylinder is securely held against the outer cylinder and against the shaft solely by the radial reaction of the inner cylinder.

In Figs. 6 and 7 are shown a modified form of making the assembly in which the tube 13A has a leading end thereof bound by a wire band 15A to make a restricted neck beyond the leading end of the shaft 17A. Such shaft may be the finished shaft, and the shaft thereby acts as a ram to move the inner sleeve axially into the outer sleeve, as shown in Fig. 7. In such modification, the outer diameter of the sleeve 13A is greater than the inner diameter of the cylinder 16A, whereby the rubber-like material of the inner sleeve is elongated as it becomes reduced in diameter during its progress axially through the outer sleeve, and is thus placed under radial compression uniformly throughout its length so as to adhere firmly not only to the outer cylinder, but also to the shaft, whereby a firm bond is made without the need for vulcanization or the use of cement. At the completion of the operation shown in Fig. 7, the inner sleeve is trimmed off flush with the ends of the outer sleeve and the device is ready for use.

An advantage of the present invention is the fact that the resulting roll may have a relatively hard outer surface and a relatively soft inner surface without the necessity either for a vulcanizing or cementing operation. The method of manufacture assures an even distribution of stress of the stretched material, and thereby achieves a satisfactory result in a simple and expeditious manner.

I claim:

1. A method of making a roll comprising binding one end of a resilient tube on a hollow support, binding the other end on a member projecting through the support and tube, forcibly protruding the member farther from the support to elongate the tube and reduce its diameter, telescoping a second resilient tube over the first tube, retracting the member to allow the first tube to expand in diameter to grip the second tube, trimming the first tube to cause its end to be flush with the end of the second tube, and pressing a shaft axially through such mounted first tube until it projects beyond the opposite ends of the tubes, whereby a shaft suitable for mounting in bearings is drivingly connected to the second tube through the intermediacy of the first tube.

2. The method of making a roll having a comparatively hard resilient exterior cushioned on a shaft adapted to be mounted in bearings at each end of the roll comprising taking a tube of comparatively hard resilient material, taking a shaft materially longer than the tube and having a diameter materially less than the interior diameter of this tube, putting said shaft within a tube of comparatively soft resilient material which is restricted at its front end across the leading end of the shaft, the exterior of said comparatively soft tube being then greater than the interior diameter of the comparatively hard tube, then forcing the covered shaft axially forward into the harder tube until the shaft extends beyond each end of the harder tube, the softer tube being compressed and elongated by such forcing operation, whereby the latter is bound tightly to both the shaft and the outer tube, and thereafter trimming off the excess of the inner tube about the leading end of the shaft flush with the corresponding end of the outer tube.

3. The method of making a roll comprising stretching a tube of resilient material to an increased length and decreased outer diameter, telescoping a second tube of harder material over the first tube, allowing the first tube to contract in length and thereby to expand in diameter and grip the second tube, and pressing a shaft axially through the first tube in snug engagement with the interior thereof until the shaft projects beyond each end of such tube, whereby a shaft suitable for mounting in bearings is drivingly connected to the second tube through the intermediacy of the first tube.

4. The method of making a roll comprising stretching a tube of resilient material to an increased length and decreased outer diameter, telescoping a second tube of harder material over the first tube, trimming the first tube flush with the ends of the second tube, and while the tubes are thus mutually mounted pressing a shaft axially through the first tube until it projects beyond each end of such tube.

FRED L. HAUSHALTER.

REFERENCES CITED

The following references are of record in the file of this patent:

UNITED STATES PATENTS

| Number | Name | Date |
| --- | --- | --- |
| 1,801,396 | Thatcher | Apr. 21, 1931 |
| 2,046,503 | Cooper | July 7, 1936 |
| 2,046,504 | Cooper | July 7, 1936 |
| 2,053,107 | Pitman | Sept. 1, 1936 |
| 2,110,783 | Welker | Mar. 8, 1938 |
| 2,181,136 | Knox | Nov. 28, 1939 |
| 2,252,299 | McCoy | Aug. 12, 1944 |
| 2,293,794 | Bell et al. | Aug. 25, 1942 |